US009223004B2

(12) United States Patent
Morrison et al.

(10) Patent No.: US 9,223,004 B2
(45) Date of Patent: Dec. 29, 2015

(54) CONTROLLING POSITION UNCERTAINTY IN A MOBILE DEVICE

(71) Applicant: QUALCOMM Incorporated, San Diego, CA (US)

(72) Inventors: William James Morrison, San Francisco, CA (US); Tao Jia, San Jose, CA (US); Joseph Czompo, San Jose, CA (US); Wyatt Thomas Riley, Chesterbrook, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/087,540

(22) Filed: Nov. 22, 2013

(65) Prior Publication Data
US 2014/0288822 A1 Sep. 25, 2014

Related U.S. Application Data

(60) Provisional application No. 61/804,464, filed on Mar. 22, 2013.

(51) Int. Cl.
*G01S 19/23* (2010.01)
*G01C 19/00* (2013.01)
*G01S 5/02* (2010.01)
*G01S 19/40* (2010.01)
*G01S 19/49* (2010.01)
(Continued)

(52) U.S. Cl.
CPC ............ *G01S 5/0257* (2013.01); *G01C 21/206* (2013.01); *G01S 19/23* (2013.01); *G01S 19/40* (2013.01); *G01S 19/49* (2013.01); *G01C 22/006* (2013.01)

(58) Field of Classification Search
CPC .... G01S 19/23; G01C 21/206; G01C 22/006; G01C 21/165; G01C 19/00; G01C 21/28; A61B 5/0022; A61B 5/1112; G08B 21/24; H04W 52/0261; H04W 64/006
USPC ............ 701/408, 433, 466, 431; 340/539.13; 455/575.1, 456.1; 713/324; 702/142
See application file for complete search history.

(56) References Cited

U.S. PATENT DOCUMENTS

| 6,546,336 B1 | 4/2003 | Matsuoka et al. |
| 2010/0125414 A1 | 5/2010 | Okuyama et al. |
| 2010/0130229 A1 | 5/2010 | Sridhara et al. |

(Continued)

OTHER PUBLICATIONS

International Search Report and Written Opinion—PCT/US2014/031436—ISA/EPO—Jul. 21, 2014.

(Continued)

*Primary Examiner* — Tuan C. To
*Assistant Examiner* — Yuri Kan
(74) *Attorney, Agent, or Firm* — Muncy, Geissler, Olds & Lowe, P.C.

(57) ABSTRACT

Systems and methods for constraining growth in position uncertainty of a mobile device are based on determination that the mobile device is in a pedestrian mode. Determination of the pedestrian mode is based on detection of steps by a pedometer, speed of motion of the mobile device, turn rate determination by a gyroscope, charging condition of the mobile device, availability of satellite signals, etc. Step counts and/or turn rate information are used to ascertain the distance that a pedestrian user may have traversed from a last known position, based on which growth of position uncertainty is controlled.

22 Claims, 5 Drawing Sheets

(51) Int. Cl.
*G01C 21/20* (2006.01)
*G01C 22/00* (2006.01)

(56) References Cited

U.S. PATENT DOCUMENTS

| | | |
|---|---|---|
| 2011/0149266 A1 | 6/2011 | Motzer et al. |
| 2011/0177848 A1* | 7/2011 | Tanabe ..................... 455/575.1 |
| 2011/0239026 A1* | 9/2011 | Kulik ............................ 713/324 |
| 2011/0313650 A1 | 12/2011 | Tome |
| 2012/0109517 A1* | 5/2012 | Watanabe .................... 701/431 |
| 2012/0203453 A1 | 8/2012 | Lundquist et al. |
| 2012/0215442 A1 | 8/2012 | Sambongi |
| 2012/0245839 A1* | 9/2012 | Syed et al. ................... 701/408 |
| 2012/0303271 A1* | 11/2012 | Chowdhary et al. .......... 701/433 |
| 2012/0309411 A1* | 12/2012 | MacGougan et al. ..... 455/456.1 |
| 2013/0006573 A1 | 1/2013 | Brunner et al. |
| 2013/0162430 A1* | 6/2013 | Scherzer et al. ......... 340/539.13 |
| 2014/0180626 A1* | 6/2014 | Kimishima, Masato ..... 702/142 |

OTHER PUBLICATIONS

Li Y., et al., "Dead Reckoning Navigation with Constant Velocity Update (CUPT)," Control Automation Robotics&Vision (ICARCV), 2012, 12th International Conference on, IEEE, Dec. 5, 2012, pp. 160-165.

* cited by examiner

CONTROLLING POSITION UNCERTAINTY IN A MOBILE DEVICE

CROSS-REFERENCE TO RELATED APPLICATIONS

The present application for patent claims the benefit of U.S. Provisional Application No. 61/804,464, entitled "PEDESTRIAN NAVIGATION USING A PEDOMETER AND MOTION CLASSIFICATION IN A MOBILE DEVICE," filed Mar. 22, 2013, assigned to the assignee hereof, and expressly incorporated herein by reference in its entirety.

FIELD OF DISCLOSURE

Disclosed embodiments are directed to controlling growth of position uncertainty of a mobile device, based on determination that the mobile device is in a pedestrian mode, and information from motion sensors such as a pedometer and a gyroscope.

BACKGROUND

Applications related to tracking, navigation, positioning, etc., of mobile devices are becoming increasingly sophisticated. Global navigation satellite systems (GNSS) such as global positioning systems (GPS) are satellite-based systems used for navigation or position determination of a mobile device, based, for example, on trilateration of wireless signals received from satellites to estimate geographic position and heading. Hybrid positioning is also possible using wireless signals from cellular networks or terrestrial sources, such as wireless wide area networks (WWAN), code division multiple access (CDMA), long term evolution (LTE) networks, etc. However, tracking or positioning of a mobile device using these conventional positioning approaches may not be possible, or accuracy may be significantly degraded in locations where such wireless signals are weak or non-existent.

For example, conventional approaches may fail in cases of pedestrian navigation which relies only on external assistance received through wireless signals. In the case of a pedestrian user carrying a mobile device, navigation may be performed with acceptable accuracy and quality when the user is in an environment with strong wireless signals being present. In other words, uncertainty in the user's position is low. However, there are many situations where the signal strength may fade, sometimes drastically. For example, if the user enters an office building, the wireless signals can attenuate drastically, and further, due to reflection, refraction, multipath effects, etc., position accuracy using these wireless signals is reduced. When strength of wireless signals used for position estimation is weak or degraded, the user's position uncertainty tends to increase.

Kalman filters (KF) are known in the art for applications in positioning and navigation. Briefly, position estimation using a KF model involves a two-step process. In a first step, the KF produces an estimate of current state variables, along with their uncertainties. In a second step, an outcome is observed with the estimates, and based on the outcome, the estimates are updated, for example, using a weighted average, wherein higher weight is given to the estimates with lower uncertainties. Thus, the KF model involves a recursive algorithm, and can be applied in real time for position estimation using current state variables, for example, related to position (e.g., estimated geographical coordinates) and associated uncertainties. These estimates can be refined over time to obtain a user's position with higher accuracy. When strong wireless signals are available, positioning, for example, based on trilateration of satellite signals, will produce position estimates of high accuracy or low uncertainty. However, when the signals degrade, the uncertainties in position estimates increase.

In general, the uncertainty increases with time, and typical position estimation techniques tend to assume worst case conditions when dealing with uncertainties. For example, in a signal outage condition, traditional GNSS receivers assume that a user's dynamics pertain to the user travelling on a vehicle, instead of the user being a pedestrian, and this assumption would result in a significantly higher position uncertainty as a function of time while the outage persists. Existing techniques typically fail to correctly classify a user's motion as pedestrian motion where necessary, and thus the uncertainty growth is not properly checked.

Even if the user was correctly classified as a pedestrian in some cases, the conventional techniques continue to rely on worst case assumptions for estimating the user's position uncertainty. For example, worst case assumptions for a pedestrian user in this context would pertain to the assumption that the user would follow a straight line path throughout the duration of the signal outage. Following a straight line path from the last known accurate (or high precision) location of the user would get the user furthest away from the last known accurate location. In a more descriptive example, if the pedestrian user leaves an environment with strong wireless signals (e.g. outdoors with an open view to the sky), and enters an environment with weak or non-existent signal conditions (e.g. an office building with numerous walls and obstruction), the uncertainty in the user's position in a conventional KF model will be based on the user following a straight line path and the uncertainty would continue to monotonically increase until the user regains an accurate location fix. These assumptions lead to inaccuracies because the user's actual behavior is likely to differ from the worst case assumptions (e.g., if the worst case assumptions involved a straight line trajectory, but the user in fact remained stationary or moved around with many turns). The conventional KF models would have caused the uncertainty to increase needlessly to a large value.

Because of the high uncertainty accumulated, the time taken to overcome the high uncertainty and regain a more accurate position estimate when the user returns to strong signal conditions would be high. Moreover, a priori user position information, which may be stored by in some KF models with a view to improving subsequent user position estimates, cannot be leveraged effectively because of the high position uncertainty which can accumulate. Effectively, these shortcomings of conventional techniques lead to poor user experience.

Accordingly, there is a need for overcoming aforementioned problems associated with conventional handling of position uncertainty in the art of position estimation and navigation.

SUMMARY

Exemplary embodiments are directed to systems and methods for controlling growth of position uncertainty of a mobile device, based on determination that the mobile device is in a pedestrian mode, and information from motion sensors such as a pedometer and a gyroscope.

For example, an exemplary embodiment is directed to a method of controlling position uncertainty of a mobile device, the method comprising: determining that the mobile device is in a pedestrian mode, determining a step count for the mobile device in the pedestrian mode, based on a pedometer located on the mobile device, and controlling growth in position uncertainty of the mobile device based on the step count.

Another exemplary embodiment is directed to method of controlling position uncertainty of a mobile device, the method comprising: determining that the mobile device is in a pedestrian mode, determining a turn rate of the mobile device in the pedestrian mode, based on a gyroscope located on the mobile device, and controlling growth in position uncertainty of the mobile device based on the turn rate.

Another exemplary embodiment is directed to a mobile device comprising: pedestrian mode activation logic configured to determine that the mobile device is in a pedestrian mode, a pedometer to determine step count for the mobile device in the pedestrian mode, and position uncertainty control logic configured to control growth in position uncertainty of the mobile device based on the step count.

Yet another exemplary embodiment is directed to a system comprising means for determining that a mobile device is in a pedestrian mode, means for determining a step count for the mobile device in the pedestrian mode, and means for controlling growth in position uncertainty of the mobile device based on the step count.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
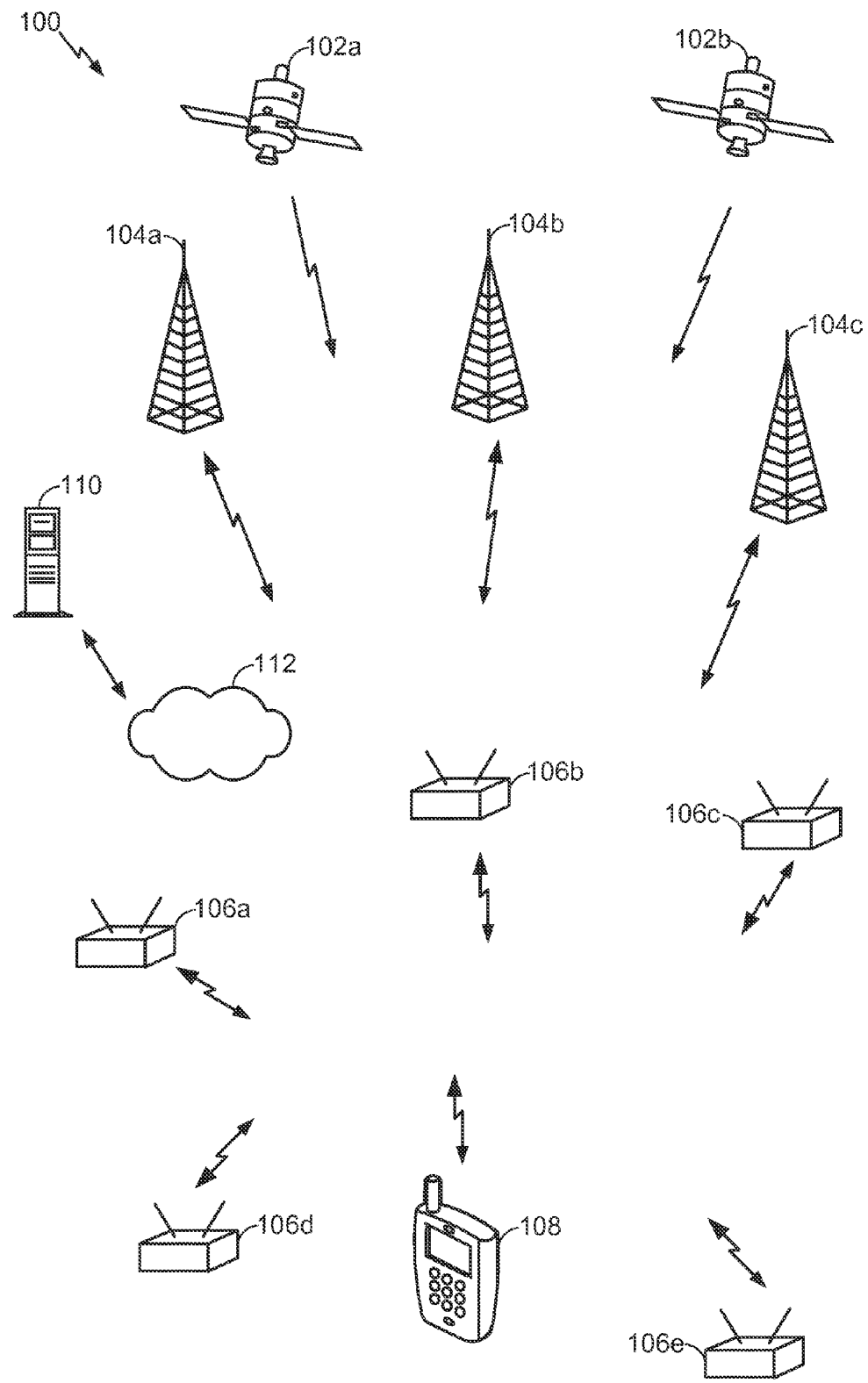
FIG. 1 illustrates an exemplary operating environment wherein exemplary aspects may be deployed.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are directed to improving or augmenting conventional position determination techniques of mobile devices, with one or more motion estimation techniques based on inertial sensors integrated in the mobile devices. More specifically, embodiments are directed to reducing uncertainty, or rather, controlling grown in uncertainty in position estimation of mobile devices, by the use of motion classification and position estimation using inertial sensors, such as, accelerometers, gyroscopes, etc.

Many modern mobile devices come equipped with one or more inertial sensors and other motion sensors which can be employed in motion classification, relative position estimation, determination of velocity, acceleration, orientation, a user's step count, etc. In particular examples related to conventional application of a KF model in position estimation using wireless signals, cases where uncertainty would increase in an unbounded manner can be addressed with exemplary techniques. Inertial sensors can be used to classify motion of the mobile device, and thereby obtain information which can reduce the growth in uncertainty if the wireless signals are weak or unavailable. While accuracy of real time positioning using KF model would increase if uncertainty in the state variables is reduced, the time-to-fix would also be lower when strong wireless signals are available. While specific embodiments are discussed with relation to pedestrian users, numerous other applications will become clear to one skilled in the art, based on this disclosure.

Specifically, some embodiments are directed to determining position estimates for a pedestrian user of a mobile device (or "pedestrian navigation" herein), using information from motion sensors or inertial sensors, such as, pedometers and gyroscopes located on the mobile device. A pedometer may be implemented using an accelerometer, for example, and used to determine step count of the pedestrian user. In some embodiments, information from a gyroscope may be used to detect turns or derive information regarding turn rate. Step count and/or turn rate information can be used to curb the growth of position uncertainty for the pedestrian user, or when it is determined that a user is in a pedestrian mode. Aspects directed to deriving assistance from motion sensors for position estimation may be implemented as optional features, which may be enabled or disabled using several trigger conditions, in order to supplement or augment position determination of an exemplary mobile device using wireless signals from one or more signal sources.

In further aspects, accuracy of indoor positioning of a mobile device, for example, can also be enhanced. It is known in the art for using wireless signals from other existing wireless networks, such as, for example, a wireless local area network (WLAN) (e.g., 802.11x standards), for indoor positioning. This can be particularly useful where wireless signals from satellites are unavailable or weak in order to obtain accurate GNSS based positioning. However, many factors may foil accuracy in indoor positioning using these wireless signals from existing wireless networks. For example, indoor positioning using existing wireless networks typically involves received signal strength indicator (RSSI) and round trip time (RTT) measurements in the calculation of a mobile device's location. RSSI and RTT measurements of these wireless signals, as they propagate through various devices comprising the network, may be spatially variant due to, for example, multipath and/or signal interference. Moreover, such measurements may change over time based upon the type of network device and/or the network device's current networking load. Accuracy in indoor positioning using wireless networks also depends on factors such as, hardware deployment for wireless access points, time-consuming pre-deployment fingerprinting, and/or calibration of the operational environment, etc., which are not only costly, but are also usually imprecise.

Exemplary embodiments can improve accuracy in indoor positioning using wireless signals from non-satellite sources, such as, Wi-Fi, WLAN, etc. Once again, by reducing position uncertainty using motion classification based on motion sensors, exemplary mobile devices can combine the motion classification with Wi-Fi based positioning, for example, in order to arrive at more precise positioning than possible using Wi-Fi alone.

According to exemplary aspects information derived from motion sensors such as pedometers and gyroscopes, can be used to classify and predict/track the user's motion, and thus, prevent the uncertainty from increasing. A pedometer can be implemented using an accelerometer, to provide an indication the user has taken a step. In some embodiments, a gyroscope may be provided for turn detection. The user's movement can be recognized as pedestrian motion, based, for example, on step detection by the pedometer, or the GNSS speed of a user resembling that of a pedestrian, rather than that of an automobile, for example. In some cases, use of motion sensors for position estimation can be triggered when it is recognized that satellite signal reception is weak or non-existent. An initial position estimate may be based on the pedestrian user's last known position (e.g., based on trilateration of satellite signals). The pedometer can supply information related to the number of steps taken by the user from the initial position estimate, which can provide a coarse indication of the user's location, and thus, a new or current position estimate, but with lower uncertainty than that which would have been assumed in the KF model absent information gleaned from the pedometer. The above aspects may apply whether or not heading of the user is tracked.

Tracking heading (or direction of motion) comprises obtaining an initial estimate of a user's heading and related heading uncertainty (e.g., based on information derived from satellite signals, a magnetometer, etc.). Thereafter, the user's heading and heading uncertainty are estimated as either a function of time and the user's speed of motion, or using a sensor based heading propagation model. Estimations based on the function of time and the user's speed of motion rely on the assumption that variation in heading depends on the user's speed and age of, or time elapsed since, the initial heading estimate. A sensor based heading propagation model functions like the well known attitude heading reference system (AHRS), wherein the user's heading uncertainty is estimated based on measurements from sensors such as, gyroscopes and accelerometers.

Position uncertainty can be further reduced by the use of constraints. In some aspects, if heading (direction of motion) of the mobile device is tracked, and uncertainty is low, with the use of a pedometer as described above, for example, it is possible to use along track constraints, to achieve further preciseness in the location of the user. An along track constraint on the position uncertainty consists of constraining the user speed or change in position along the direction of user motion as defined by the user heading and heading uncertainty. For example, if user speed is known to be 3 m/s, the position and position uncertainty can be propagated in the direction of the user heading at this rate.

Further, it may be possible to track heading in GNSS denied areas or indoor locations using assistance from wireless networks (e.g. WLAN, Wi-Fi, etc). One or more cross track constraints can also be applied to denote that the user of the user of the mobile phone will not switch directions quickly. However, even when heading is not tracked, or where heading is not known, using the pedometer and motion classification can limit the growth of position uncertainty. For example, in some embodiments, if no steps are detected by the pedometer, or if the step count is zero, the motion classification of the user may reveal that the user is stationary, and therefore, and determining the motion state of the user to be a stationary state can be used for preventing position uncertainty from increasing. Similarly, if the number of steps (and in further optional refinements, step length), is well known, then the position uncertainty can be constrained based on this information, such that the position uncertainty would be lower than a conventional set up in a GNSS denied area without exemplary techniques applied. Step or stride length can be calculated, for example during strong signal conditions. If the user is detected to be walking (e.g. based on speed of motion obtained by GNSS based speed calculations and/or detection of steps by the pedometer), then based on step count provided by the pedometer and GNSS speed, an average stride length can be obtained. With an average stride length known, the position uncertainty in GNSS denied areas can be further restrained using a pedometer, as the average stride length combined with step count can provide a better estimate of distance traversed.

In some additional aspects, the user's turns can be tracked, for example, using a gyroscope. As previously discussed, in general, given a number of turn rates and position uncertainty varying from zero to the position uncertainty corresponding to maximum position uncertainty pertaining to a straight line trajectory, a higher turn rate corresponds to a lower position uncertainty, and a lower turn rate corresponds to a higher position uncertainty. For example, if the user displays characteristics of random walk or walking around the office building, for example, as seen from a large number of turns within a small number of steps covered, then intelligent assumptions may be made that the distance traversed by the user since the last known location is relatively small (i.e., lower than a straight line distance), and based on this, the position uncertainty may be restrained to be low. On the other hand, if the user is seen to make no turns or follow a straight line/linear trajectory, this would correspond to the maximum distance the user may have traveled from the last known location, and this information can be applied to constrain position uncertainty accordingly. It will be understood that detecting turn rate using a gyroscope can be implemented regardless of whether heading is tracked, and a gyroscope can provide an additional layer of preciseness in the calculations of the user's position.

Some embodiments of this disclosure are discussed with reference to indoor positioning. These references are illustrative of weak or non-existent wireless signal conditions. Similar references are also made to GNSS denied or GNSS degraded/GNSS challenged areas, and as such, these may include outdoor areas in urban environments with a dense population of high buildings, for example, which may interfere with or block reception of strong GNSS and/or terrestrial signals. However, it will be understood that there is no restriction on the deployment of exemplary techniques, and information from motion sensors can be used for controlling position uncertainty, even when strong wireless signals for positioning purposes are available. The above and additional aspects will now be described with reference to the figures.

Firstly with regard to FIG. 1, an exemplary operating environment 100 for mobile device 108 configured according to exemplary embodiments, and having wireless positioning capability, will be described. Operating environment 100 may include one or more different types of wireless communication systems and/or wireless positioning systems. Wireless signals from satellites or GNSS sources 102a-b may be used for trilateration of mobile device 108. One or more terrestrial sources, such as cellular base stations, Wide Area Network Wireless Access Points (WAN-WAPs), wide area wireless network (WWAN), WiMAX (e.g., 802.16), etc are illustrated as sources 104a-c, which may be used for wireless voice and/or data communication, and as another source of position information for mobile device 108. Typically, sources 104a-c may operate from fixed positions, and provide network coverage over large metropolitan and/or regional areas. One or more other wireless signal sources such as Local Area Network Wireless Access Points (LAN-WAPs), WLAN, Wi-Fi networks (802.11x), cellular piconets and/or femtocells, Bluetooth Networks, etc., are illustrated as sources 106a-e, which may be used for wireless voice and/or data communication, as well as yet another source for positioning data. Sources 106a-e may operate in indoor environments, such as buildings, and capable of performing communications over smaller geographic regions than a WWAN, for example. Mobile device 108 may derive position information from any one or more of sources 102a-b, 104a-c, and/or 106a-e, in any suitable combination. Furthermore, embodiments can conform to other types of positioning systems that utilize pseudolites or ground-based transceivers. When deriving position, mobile device 108 may utilize time of arrival techniques with the assistance of positioning server 110, which may communicate with mobile device 108 through network 112.

Figure 2:
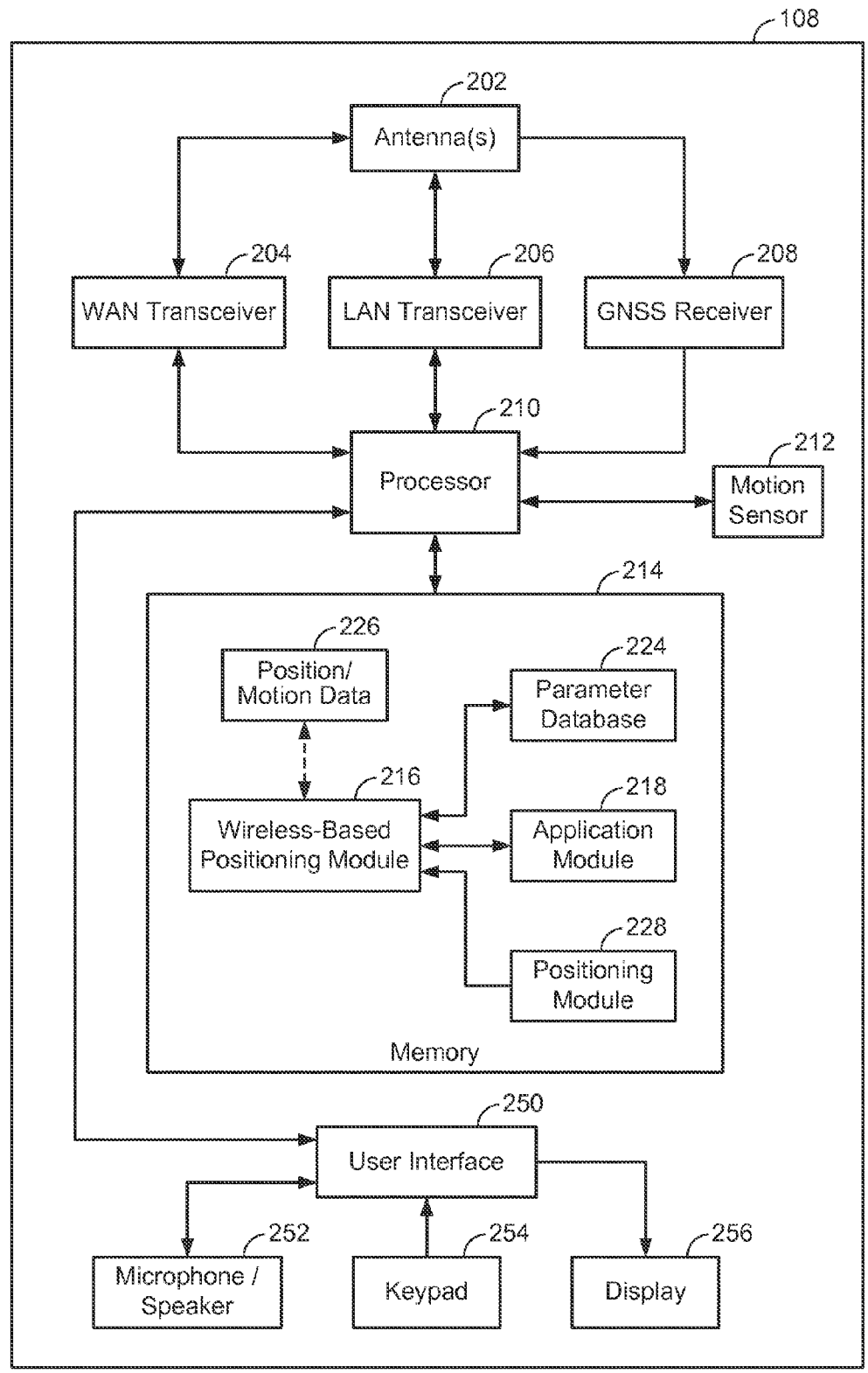
FIG. 2 illustrates an exemplary mobile device configured according to exemplary embodiments.

FIG. 2 is a block diagram illustrating various components of exemplary mobile device 108. Wide area network (WAN) transceiver 204 may be connected to one or more antennas 202 for communicating with and/or detecting signals to/from sources 104a-c. Wireless local area network (WLAN) transceiver 206 may be connected to one or more antennas 202 for communicating with and/or detecting signals to/from sources 106a-e. GNSS receiver 208 may be connected to the one or more antennas 202 for receiving satellite signals.

Additionally, mobile device 108 may comprise motion sensor 212, which may be coupled to processor 210 to provide movement and/or orientation information which is independent of motion data derived from signals received by WAN transceiver 204, WLAN transceiver 206 and GNSS receiver 208, which are also connected to processor 210. By way of example, motion sensor 212 may utilize motion sensors such as an accelerometer (e.g., a MEMS device), a gyroscope, a geomagnetic sensor (e.g., a compass), an altimeter (e.g., a barometric pressure altimeter), and/or any other type of movement detection sensor. In exemplary embodiments, motion sensor 212 may utilize one or more components or features derived from motion sensors, such as, a pedometer (e.g., as derived from an accelerometer, to detect step counts), and/or a motion classifier or motion mode detector (e.g. to classify/detect motion modes such as stationary, running, driving, etc., which will be discussed further below). Moreover, motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems. Processor 210 may include one or more microprocessors, microcontrollers, and/or digital signal processors that provide processing functions, as well as other calculation and control functionality. Processor 210 may be coupled to memory 214, which may include and/or otherwise receive information related to wireless-based positioning module 216, application module 218, positioning module 228, parameter database 224, and position/motion data module 226, whose functions are recognizable by one of ordinary skill in the art, and a detailed description of these will be avoided herein for the sake of brevity.

Processor 210 may include any form of logic suitable for performing at least the techniques provided herein. For example, the processor 210 may be operatively configurable based on instructions in the memory 214 to selectively initiate one or more routines that exploit motion data for use in other portions of the mobile device. Mobile device 108 may include user interface 250 which provides any suitable interface systems, such as microphone/speaker 252, keypad 254, and display 256 that allows user interaction with mobile device 108. As used herein, mobile device 108 and/or mobile station 200 may be any portable or movable wireless device or machine that is configurable to acquire wireless signals transmitted from, and transmit wireless signals to, one or more wireless communication devices or networks. As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or GNSS signals.

Figure 3:
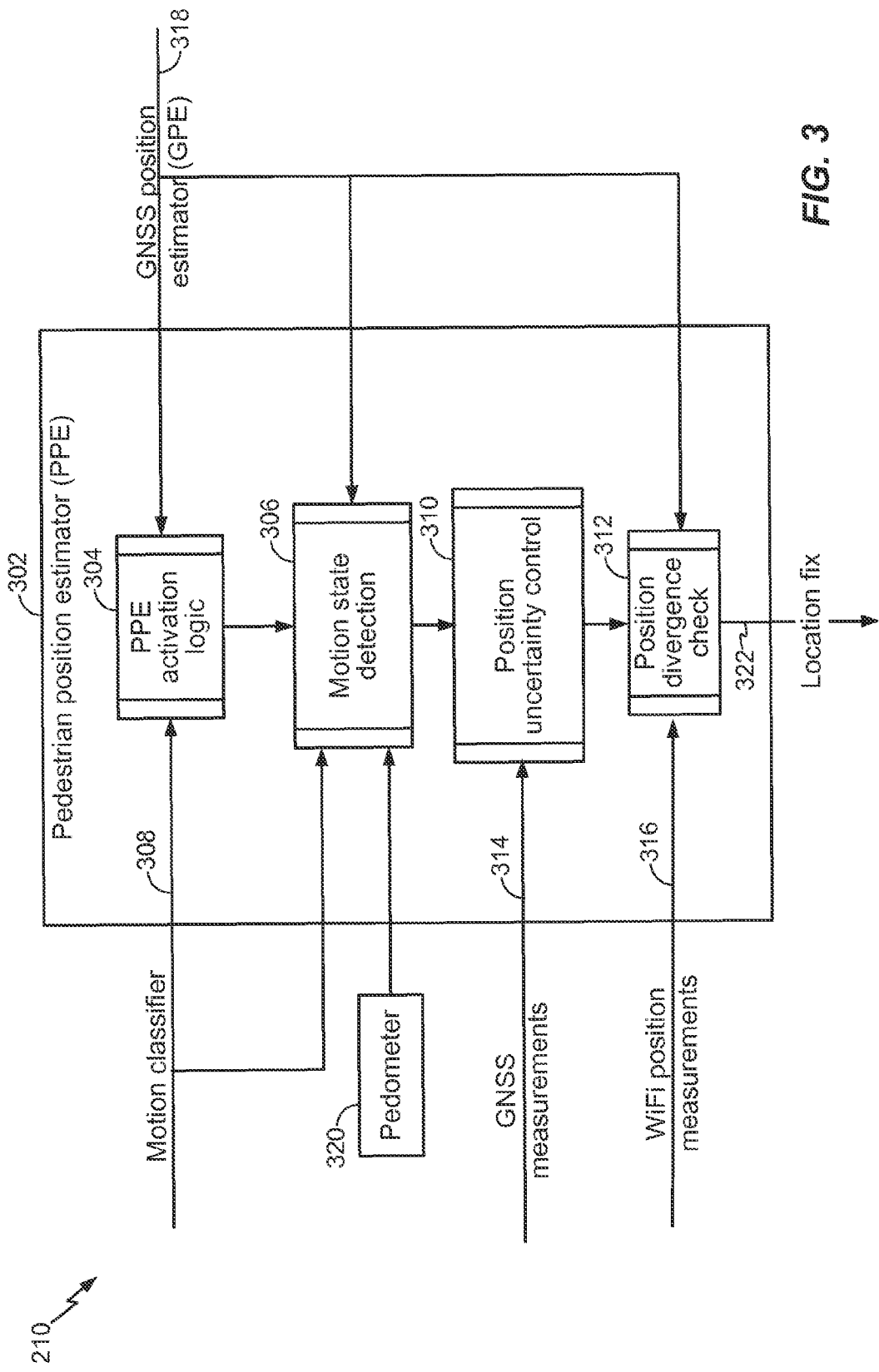
FIG. 3 illustrates an exemplary pedestrian location estimator configured according to exemplary embodiments.

With regard to FIG. 3, an exemplary embodiment pertaining to constraining growth in position uncertainty in a mobile device, for example, when it is determined that the mobile device is in pedestrian mode, or in other words, a user of the mobile device is a pedestrian. As illustrated in FIG. 3, processor 210 of mobile device 108 can include pedestrian position estimator (PPE) 302. Briefly, PPE 302 can include, or be coupled to a motion sensor, such as pedometer 320 (e.g., implemented using an accelerometer), which can be used in motion classification. While PPE 302 is shown to be part of processor 210, the logic, hardware, or software related to PPE 302 can be embedded or integrated in any other suitable part or component of mobile device 108 without departing from the scope of this disclosure. Moreover, not all illustrated components of PPE 302 are necessary for the implementation of exemplary embodiments, and one or more of the parts or features of PPE 302 are optional, as will be understood based on this description.

Initially, activation or enablement of PPE 302 will be described. In general, PPE 302 can be activated when the user carrying mobile device 108 is in a pedestrian mode or pedestrian state and deactivated otherwise. While detection of a pedestrian mode may be based on detection of steps by a pedometer, this may not be an accurate test. Accordingly, other conditions may be used in the activation or deactivation of PPE 302 in some embodiments. Pedestrian mode activation logic such as, PPE activation logic 304 can be used to enable PPE 302 when required, for example, when mobile device 108 is in pedestrian mode; and disable or power down PPE 302 when PPE 302 is not in active use, in order to save power. PPE 302 may be enabled or activated using PPE activation logic 304 when the user carries mobile device from a strong GNSS area to a GNSS denied/degraded area, for example. For purposes of enabling/disabling PPE 302, detection of a user carrying mobile device 108 being in motion may be based on whether mobile device 108 is plugged in or is being charged, with the assumption being that if mobile device 108 is plugged in for charging, the device is likely stationary. However, this assumption may not be valid in some cases, for example, if mobile device 108 is configured to be capable of being charged wirelessly with emerging technologies which enable wireless charging of mobile devices. Thus, in such situations, a state of wireless charging may need to be distinguished from being plugged into a stationary power outlet for charging. Even if the power outlet is not stationary, as such, for example, when mobile device 108 is plugged into a car charger of a moving automobile, it would be unnecessary to activate PPE 302 because the user is not in a pedestrian mode. Therefore, it will be understood that for purposes of determining whether PPE 302 may be enabled according to some embodiments, it may be assumed that being in a state of charging means that mobile device 108 is plugged in or connected to a wired charger, unless stated differently.

Accordingly, detection of the following conditions may be used in pedestrian mode activation logic or PPE activation logic 304, for enabling PPE 302: mobile device 108 being disconnected from a charger; speed of motion (e.g., GNSS based speed) is less than a certain threshold (e.g., 5 m/s, corresponding to the speed of a moving automobile, for example); speed of motion is greater than 0 m/s (corresponding to a mobile device 108 being stationary); and pedometer 320 detects steps. On the other hand, PPE 302 may be deactivated when the following conditions are met: mobile device 108 is connected to a charger; or if the GNSS speed is greater than a predetermined threshold for at least a certain duration of time (e.g., greater than 6 m/s for at least 10 s, to correspond to a definitive indication that the user is in motion, but is not walking, but is in a moving automobile). While it is possible to base detection of pedestrian mode on GNSS speed, there is a risk of confusion with a slow moving vehicle with comparable speed. Thus, it is preferable to include step detection in the determination of activating or deactivating PPE 302. In some cases, information regarding the motion state, pertaining to whether mobile device 108 is stationary or in motion, can be determined outside PPE 302 and input to PPE activation logic 304 through the signal or bus, motion classifier 308.

With continuing reference to FIG. 3, motion state detection block 306 can include logic, means, and/or code for determining a motion state. Motion classification or motion mode indications from pedometer 320 (or in general, any means for determining steps taken by a user carrying mobile device 108) are used herein to adjust dynamic behavior of PPE 302 through control of process noise parameters and velocity/speed updates (e.g., based on GNSS speed). Motion state detection block 306 can be used to determine process noise in pedestrian mode and be configured to control position uncertainty by classifying motion into certain predefined states. Such motion states include: "absolute rest" (e.g., when mobile device 108 is stationary on a stable surface or non-moving platform); "walking/running" (e.g., based on stride length, which can be calculated during an active GNSS session, and detection of steps by pedometer 320); "stationary" (e.g., pedometer 320 does not detect steps, but mobile device 108 may be in a stationary vehicle or held by a non-moving user, but not on a stable surface); and "unknown" (e.g., when a moving vehicle is detected, no steps corresponding to a pedestrian motion are detected, an unknown motion state, etc.). Once again, classification of motion states may be based on input from pedometer 320, as well as, the signal or bus, motion classifier 308.

Based on the motion state determined as above, position uncertainty can be determined using position uncertainty control block 310 (or in general, any means or for determining position uncertainty based on the motion state). In examples where the KF model is used in position estimation, the motion state can be used to update the KF states. The position uncertainty control and update of KF states can be performed, for example, in position uncertainty control block 310. GNSS signal quality and other related GNSS measurements can be supplied through the signal or bus, GNSS measurements 314 input to position uncertainty control block 310. The GNSS quality may be determined to be insufficient if a number of measurements of the GNSS signal fall below a predetermined threshold. Velocity process noise (VPN) and zero velocity update (ZUPT), which can relate to uncertainty, can be determined based on pre-specified thresholds or tables corresponding to the GNSS quality measurements. Low GNSS signal quality, due to the augmentation of information from pedometer 320 in the location estimation. In an example, if the user transitions from a strong GNSS available area to GNSS denied conditions, steps or speed derived from pedometer 320 can be applied as a ZUPT in the KF model, which would limit the growth in position uncertainty. The VPN estimated or assigned to the detected motion states, and based on GNSS signal quality, can be used in controlling the uncertainty.

In some embodiments, correctness of PPE 302 or a divergence check can be performed using the input GNSS position estimator 318, for example, using position divergence check block 312. The determined position uncertainty information from PPE 302 can be consolidated with existing or conventionally derived location information, for example from wireless signals, to ensure that the estimated location has low uncertainty. The wireless signals can include terrestrial signals, such as, WiFi or cellular network signals and/or GNSS/satellite signals. For example, WiFi based position estimation can be supplied through the input, WiFi position measurements 316 to position divergence check 312 to consolidate position uncertainty with WiFi based estimated position.

Once divergence checks in position divergence check 312 are cleared, location fix 322 can be obtained. Location fix 322 can include position uncertainty estimated using PPE 302. Location fix 322 can be combined with location estimates based on GNSS based position estimation in order to obtain a high quality location estimate for mobile device 108, with low position uncertainty.

Additionally, or alternatively, information from other motion sensors can also be to reduce position uncertainty, for example, for a pedestrian user. For example, a gyroscope (not illustrated), can indicate turn rate to estimate the user's walking patterns. As previously discussed, a high turn rate may indicate a lower distance traversed, whereas a low turn rate can tend towards a straight line trajectory and longer distances traversed. Accordingly, position uncertainty can be lower if the distance traversed is lower, and vice versa. In general, position uncertainty can be lower if the turn rate is higher. More specifically, a growth in the position uncertainty can linearly increase over time when the turn rate is low or zero, corresponding to a straight line. On the other hand, the growth in position uncertainty can be based on a non-linear numerical function over time based on higher turn rates. For example, if the turn rate indicates a random walk, the non-linear numerical function can be a square root function. Skilled persons will recognize other mathematical models which may be implemented for determining or controlling position uncertainty based on turn rate, within the scope of this disclosure. In general, embodiments may include any means or code for determining position uncertainty taking into consideration the turn rate supplied by a gyroscope (or any other means for determining turn rate) and for assigning lower position uncertainty to higher turn rate and vice versa. Further, embodiments may also include related means or code for increasing position uncertainty linearly with time when the turn rate is low or zero, and means or code for increasing the position uncertainty based on a non-linear numerical function (e.g., a square root function) over time when the turn rate is high. While such turn rater information from a gyroscope may be combined with step count information from a pedometer, this is not necessary, as some embodiments may rely on controlling growth of position uncertainty based on turn rate, with or without step count information from a pedometer.

Figure 4:
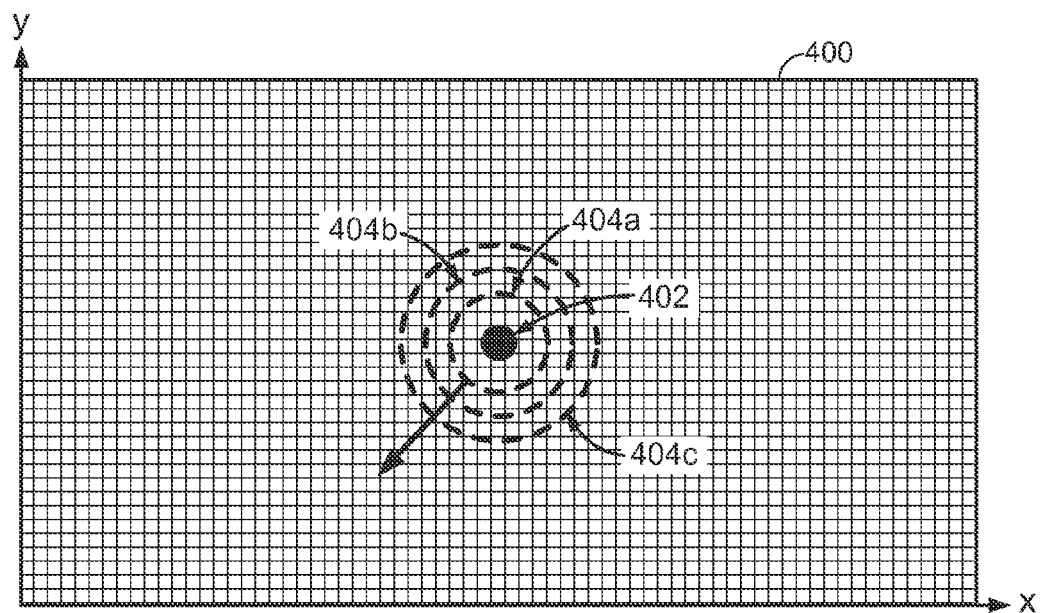
FIG. 4 is a conceptual illustration of position estimation with reduced uncertainty, using exemplary embodiments.

Indoor positioning of mobile device 108 can also be performed with aforementioned wireless signals from wireless networks such as Wi-Fi, WLAN, etc (e.g. from sources 106a-e shown in FIG. 1). With reference to FIG. 4, a conceptual illustration of position estimation using a combination of techniques in exemplary embodiments is provided. A geographical area 400 is shown as a grid with x-y axes, which may pertain to an indoor location. WLAN sources, such as sources 106a-e of FIG. 1 may be in operation, and combined with any previous position estimates from GNSS signals (e.g., sources 102a-b) and/or terrestrial signals (e.g. sources 104a-c), the position of mobile device 108 may be estimated corresponding to point 402 on area 400. However, without exemplary techniques which provide position uncertainty checks based on motion sensors, the position uncertainty may be large and continue to increase over time. This is depicted by concentric circles 404a-c, with the notion that the uncertainty is lowest for circle 404a, which is at an earlier point in time, while it is higher for circle 404c, which is at a later point in time. In conventional approaches, this uncertainty continues to grow with time, and may grow past circle 404c to a point where the uncertainty may be too high to provide any meaningful position estimate of mobile device 108. However, embodiments can control the growth in uncertainty, using for example, motion classification into the above motion states. Conceptually, exemplary embodiments may limit the uncertainty to be as low as, or lower than circle 404a and bring the uncertainty as low as possible to coincide with the precise location of mobile device 108, which is point 402.

It will be understood in this discussion that the combinations of position estimation are in fact performed in the measurement domain (i.e. based on a measurement of steps, stride length, speed, or when available, heading or velocity of the pedestrian user), rather than in a position domain. In other words, in an indoor location, the position determination using wireless signals, for example, may terminate with the determination of point 402. Thereafter, measurement of GNSS speed may not be possible, and the GNSS speed may be determined to be zero. However, with exemplary techniques, the speed or distance based on steps or stride length as a function of time (and direction/velocity in some cases) determined using PPE 302, for example, can update the KF states with high quality position estimates with low uncertainty, and thus keep the circles 404a-c from growing. Conceptually, if the uncertainty remains low in this manner and the user returns to a strong GNSS area, the time-to-fix will be much faster as very low accumulated uncertainty (or correctly updated KF states) will be available as a starting point for position estimation of mobile device 108 using high quality GNSS signals.

While the above techniques are generally described with regard to user motion information derived from pedometer 320, it is possible to use an accelerometer instead of or in addition to pedometer 320 in related embodiments. For example, if motion classification into the above-described motion states for use in determining noise and related uncertainty are replaced or augmented with measurements from an accelerometer, PPE 302 may take into account, the input from such an accelerometer (not shown) in motion state detection block 306 of FIG. 3, for example. By making some assumptions and appropriate adjustments to the characterization of acceleration measurements, uncertainty can be accounted for in similar manner as described above, where step count from pedometer 320 is used, instead of acceleration measurements. Various other embodiments using one or more motion sensors, individually, or in combination, can be used for reducing position uncertainty.

Figure 5:
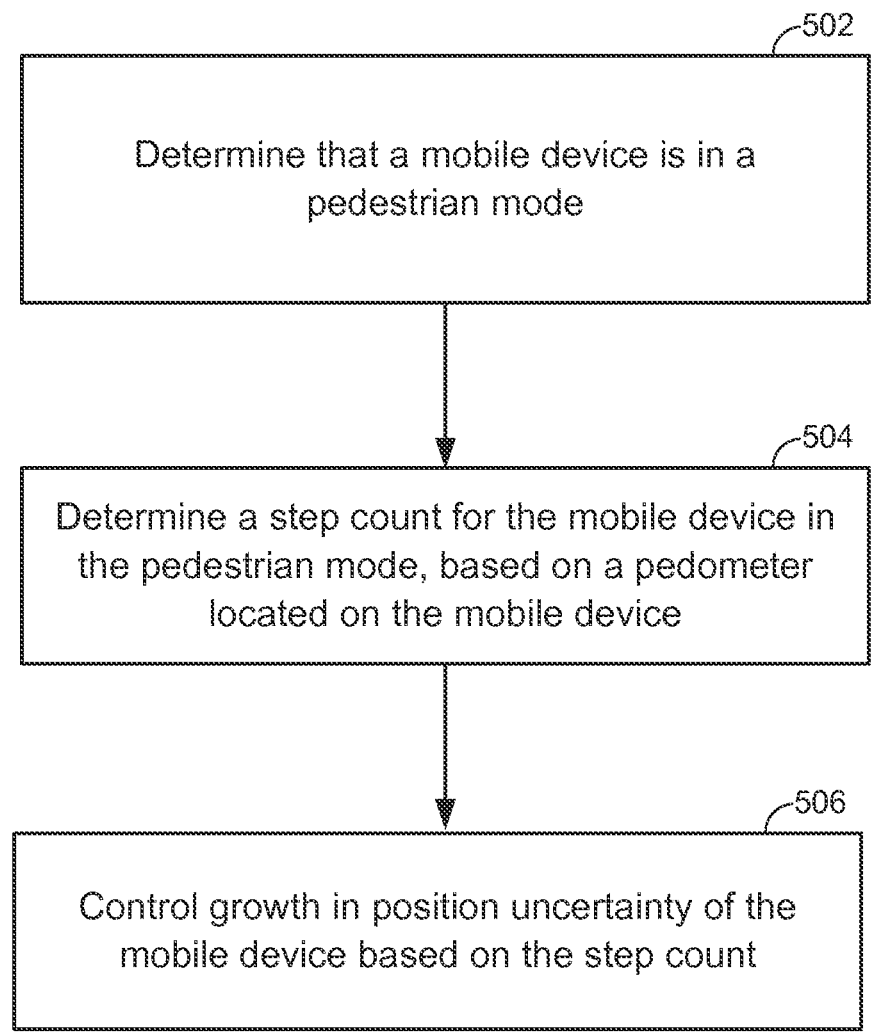
FIG. 5 illustrates a flow chart of sequences in an exemplary method of estimating position using motion sensors.

It will be appreciated that embodiments include various methods for performing the processes, functions and/or algorithms disclosed herein. For example, as illustrated in FIG. 5, an embodiment can include a method of controlling position uncertainty of a mobile device (e.g., mobile device 108), the method comprising: determining that the mobile device is in a pedestrian mode (e.g., in PPE activation logic 304)—Block 502; determining a step count for the mobile device in the pedestrian mode, based on a pedometer (e.g., pedometer 320) located on the mobile device—Block 504; and controlling growth in position uncertainty (e.g., in position uncertainty control logic 310) of the mobile device based on the step count—Block 506.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for controlling position uncertainty in a mobile device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of computing position uncertainty of a mobile device, the method comprising:
    determining, by a mobile device, a step count for the mobile device when the mobile device is in a pedestrian mode, based on a pedometer located on the mobile device;
    determining, by a gyroscope located on the mobile device, a turn rate of the mobile device in the pedestrian mode; and
    computing, by a processor located on the mobile device, position uncertainty of the mobile device based on the step count and the turn rate,
    wherein the position uncertainty is lower for a higher turn rate and the position uncertainty is higher for a lower turn rate.

2. The method of claim 1, comprising determining that the mobile device is in a pedestrian mode is based on detection of steps by the pedometer.

3. The method of claim 2, wherein determining that the mobile device is in a pedestrian mode is further based on global navigation satellite systems (GNSS) speed of the mobile device.

4. The method of claim 2, wherein determining that the mobile device is in a pedestrian mode is further based on whether the mobile device is plugged in or charging.

5. The method of claim 2, wherein determining that the mobile device is in a pedestrian mode is further based on determining that the mobile device is located in a GNSS challenged environment.

6. The method of claim 1, further comprising, preventing growth in position uncertainty of the mobile device when the step count is zero.

7. The method of claim 1, comprising increasing position uncertainty linearly with time when the turn rate is low or zero corresponding to a straight line trajectory.

8. The method of claim 1, comprising increasing position uncertainty as a square-root function over time when the turn rate is high corresponding to random walk.

9. The method of claim 1, further comprising computing position uncertainty of the mobile device based on heading of the mobile device.

10. The method of claim 9, comprising enforcing an along track constraint in computing the position uncertainty to correspond to pedestrian motion.

11. The method of claim 9, comprising enforcing one or more cross track constraints in computing the position uncertainty.

12. A method of computing position uncertainty of a mobile device, the method comprising:
    determining that the mobile device is in a pedestrian mode;
    determining, by a gyroscope located on the mobile device, a turn rate of the mobile device in the pedestrian mode and
    computing, by a processor located on the mobile device, position uncertainty of the mobile device based on the turn rate,
    wherein the position uncertainty is lower for a higher turn rate and the position uncertainty is higher for a lower turn rate.

13. The method of claim 12, comprising increasing position uncertainty linearly with time when the turn rate is low or zero corresponding to a straight line trajectory.

14. The method of claim 12, comprising increasing position uncertainty as a square-root function over time when the turn rate is high corresponding to random walk.

15. The method of claim 12, further comprising:
    determining a step count for the mobile device in the pedestrian mode, based on a pedometer located on the mobile device; and
    computing position uncertainty of the mobile device based on the step count.

16. A mobile device comprising:
    a pedometer to determine step count for the mobile device when the mobile device is in a pedestrian mode;
    a gyroscope to determine a turn rate of the mobile device in the pedestrian mode; and
    a processor configured to compute position uncertainty of the mobile device based on the step count and the turn rate,
    wherein the position uncertainty is lower for a higher turn rate and higher for a lower turn rate.

17. The mobile device of claim 16 comprising logic to determine that the mobile device is in the pedestrian mode based on detection of steps by the pedometer and speed of motion of the mobile device.

18. The mobile device of claim 16 comprising logic to determine that the mobile device is in the pedestrian mode based on detection of steps by the pedometer and detection of the mobile device in a plugged in or charging state.

19. The mobile device of claim 16 wherein the processor is further configured to prevent growth in position uncertainty of the mobile device when the step count is zero.

20. The mobile device of claim 16, wherein the processor is further configured to increase position uncertainty linearly with time when the turn rate is low or zero corresponding to a straight line trajectory.

21. The mobile device of claim 16, wherein the processor is further configured to increase position uncertainty as a square-root function over time when the turn rate is high corresponding to random walk.

22. A system comprising
    means for determining a step count for a mobile device when the mobile device is in a pedestrian mode;
    means for determining a turn rate of the mobile device in the pedestrian mode; and means for computing position uncertainty of the mobile device based on the step count and the turn rate
wherein the position uncertainty is lower for a higher turn rate and the position uncertainty is higher for a lower turn rate.

* * * * *